(12) United States Patent
Manabe

(10) Patent No.: US 6,321,041 B1
(45) Date of Patent: Nov. 20, 2001

(54) CAMERA WITH MAGNETIC RECORDING UNIT

(75) Inventor: Mitsuo Manabe, Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/409,081

(22) Filed: Sep. 30, 1999

(30) Foreign Application Priority Data

Sep. 30, 1998 (JP) .................................................. 10-277935

(51) Int. Cl.[7] .................................................... G03B 17/24
(52) U.S. Cl. ............................................................ 396/319
(58) Field of Search ..................................... 396/319, 320

(56) References Cited

U.S. PATENT DOCUMENTS

| | | | |
|---|---|---|---|
| 5,903,787 | * 5/1999 | Farling | 396/320 |
| 5,909,328 | 6/1999 | Takeshita et al. | 396/319 X |
| 6,021,281 | * 2/2000 | Tanaka et al. | 396/319 |

* cited by examiner

*Primary Examiner*—W. B. Perkey
(74) *Attorney, Agent, or Firm*—Birch, Stewart, Kolasch & Birch, LLP

(57) ABSTRACT

In a magnetic recording unit of an APS camera, a pad and a compression spring for pressing the pad toward a magnetic head to thereby press a magnetic recording layer formed on a photographic film against the magnetic head are arranged outside a fixed cylinder containing a zoom lens barrel of the camera. This reduces the length of the fixed cylinder to the minimum length required for containing the zoom lens barrel. Therefore, the camera with the magnetic recording unit can be compact.

3 Claims, 4 Drawing Sheets

F I G. 3
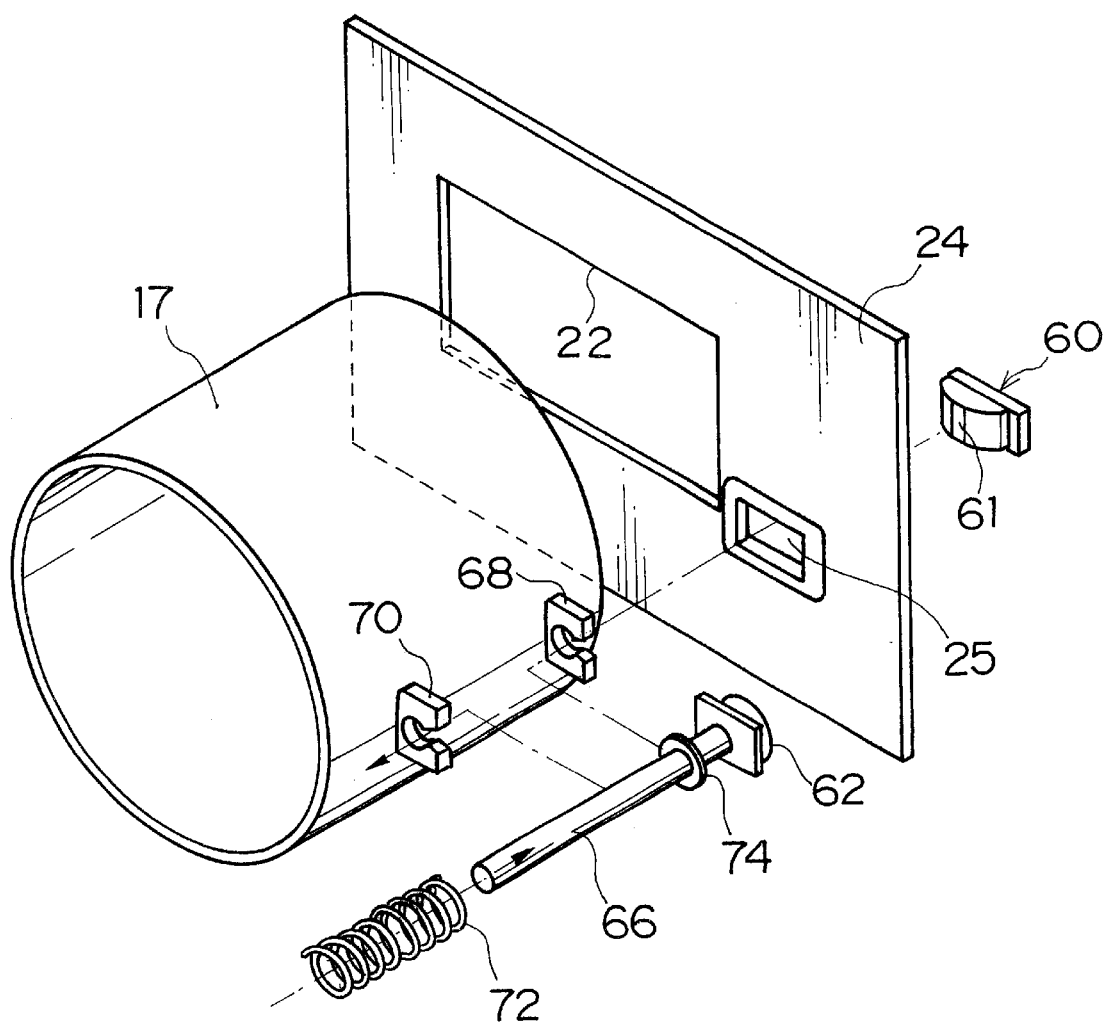

CAMERA WITH MAGNETIC RECORDING UNIT

BACKGROUND OF THE INVENTION

1. Field of the Invention

The present invention relates generally to a camera with a magnetic recording unit, and more particularly to a camera having a built-in magnetic recording unit that comprises a magnetic head and a pad and magnetically records data such as the date of photographing in a magnetic recording layer formed on a photographic film.

2. Description of Related Art

U.S. Pat. No. 5,909,328 discloses an advanced photo system (APS) camera, which has recently been on the market, employs a photographic film coated with a magnetic recording layer and writes data such as the date of photographing and photographic information in the magnetic recording layer by means of a magnetic recording unit having a magnetic head while the photographic film is fed during the photographing.

In the conventional magnetic recording unit of the APS camera, the magnetic head is fixed to a film pressure plate or a back lid of the camera, and a pad for pressing the magnetic recording layer of the film against the magnetic head is arranged at the opposite of the magnetic head across the film. The pad is attached to a leaf spring and is pressed toward the magnetic head by the leaf spring, so that the magnetic recording layer is pressed against the magnetic head by the pad.

FIG. 4 is a view of assistance in explaining the conventional arrangement of a pad 1 in a magnetic recording unit. The pad 1 and a leaf spring 2 are provided inside a fixed cylinder 4, in which a taking lens barrel is contained, formed at a body 3 of the camera. The leaf spring 2 is attached on a front face of a light-shielding rib 6 having an aperture 5. The pad 1 is arranged in an opening 7 formed in the light-shielding rib 6, and is pressed toward a magnetic head (not shown) through the opening 7 by the leaf spring 2. Consequently, the magnetic recording layer of a photographic film 8, which is fed between the light-shielding rib 6 and the magnetic head, is pressed against the magnetic head by the pad 1.

The length of the fixed cylinder 4 on the body 3 of the camera depends on the length of the taking lens barrel contained in the fixed cylinder 4. In order to reduce the size of the camera, it is necessary to minimize the length of the fixed cylinder 4. However, the camera with the conventional magnetic recording unit in FIG. 4 is constructed in such a manner that the pad 1 and the leaf spring 2 are arranged inside the fixed cylinder 4 and on the front face of the light-shielding rib 6. Hence, the fixed cylinder 4 is lengthened by thickness of the pad 1 and the leaf spring 2 in addition to the length required for containing the taking lens barrel, and the camera is large in size as a result.

SUMMARY OF THE INVENTION

In view of the foregoing, it is an object of the present invention to provide a camera with a magnetic recording unit, which reduces the size of the camera by improving the arrangement of the magnetic recording unit.

To achieve the above-mentioned object, the present invention is directed to a camera, comprising: a film cartridge chamber in which a film cartridge is loaded, the film cartridge containing a photographic film having a magnetic recording layer thereon; a take-up chamber which has a take-up spool for taking up the photographic film fed from the film cartridge loaded in the film cartridge chamber; a fixed cylinder arranged between the film cartridge chamber and the take-up chamber, the fixed cylinder containing a taking lens barrel; a magnetic head which records magnetic information onto the magnetic recording layer of the photographic film; a pad arranged to face the magnetic head, the photographic film being fed between the pad and the magnetic head; and a pressing member which presses the pad toward the magnetic head to press the magnetic recording layer of the photographic film against the magnetic head; wherein the pad and the pressing member are arranged outside the fixed cylinder.

According to the present invention, the pad and the pressing member are arranged outside the fixed cylinder, and this reduces the length of the fixed cylinder to the minimum length required for containing the taking lens barrel. Therefore, the camera can be compact.

Preferably, the camera further comprises: a rod, the pad being attached to an end the rod; and a guide member slidably guiding the rod vertically to a head gap face of the magnetic head; wherein the pressing member presses the pad vertically to the head gap face through the rod.

According to the present invention, the data can be recorded in the magnetic recording layer under stable conditions.

Preferably, the guide member is provided on an outer circumference of the fixed cylinder.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a perspective view showing the arrangement of a pad with respect to a fixed cylinder.

DETAILED DESCRIPTION OF THE PREFERRED EMBODIMENT

This invention will be described in further detail by way of example with reference to the accompanying drawings.

Figure 1:
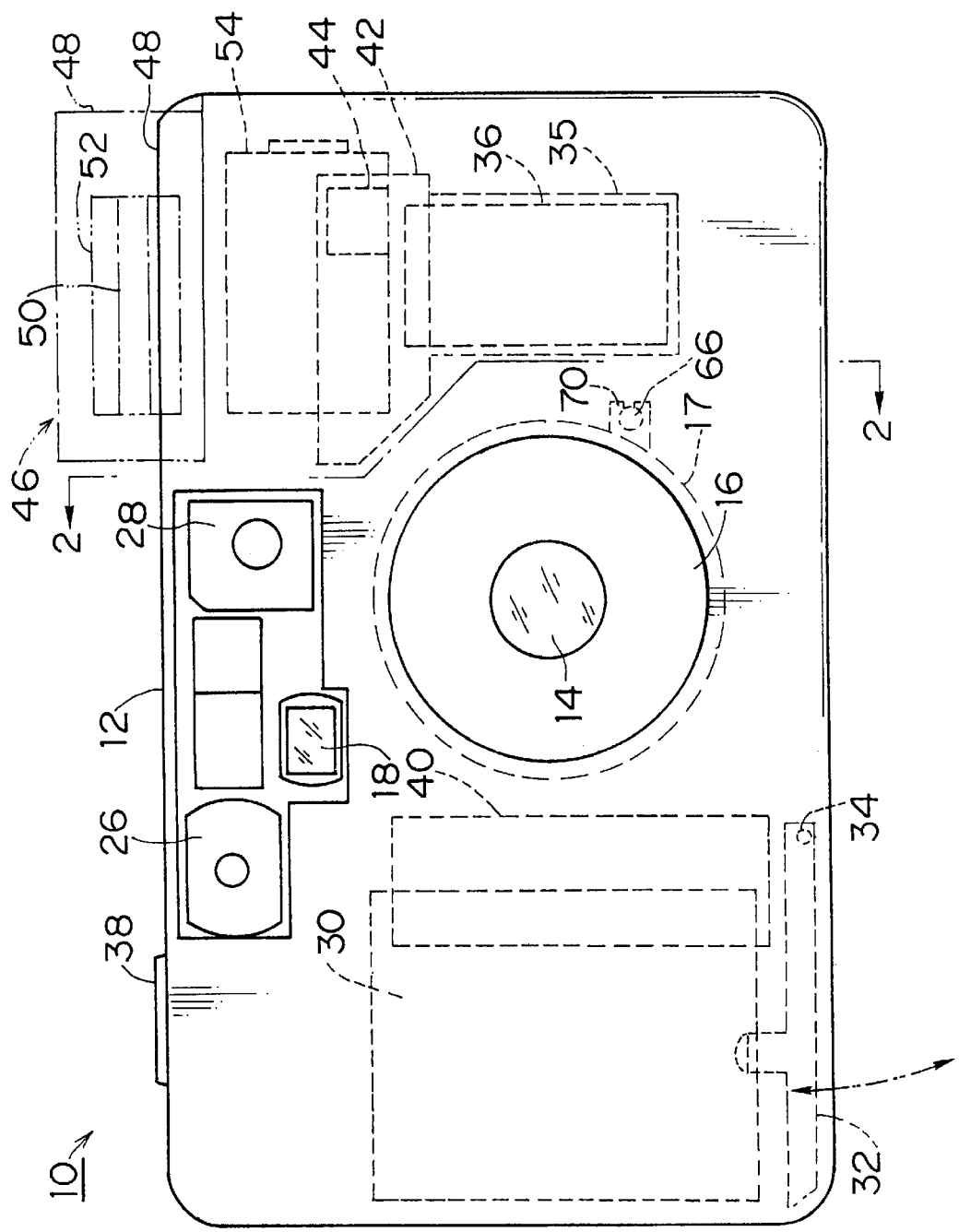
FIG. 1 is a front view showing a camera with a magnetic recording unit according to a preferred embodiment.
Figure 2:
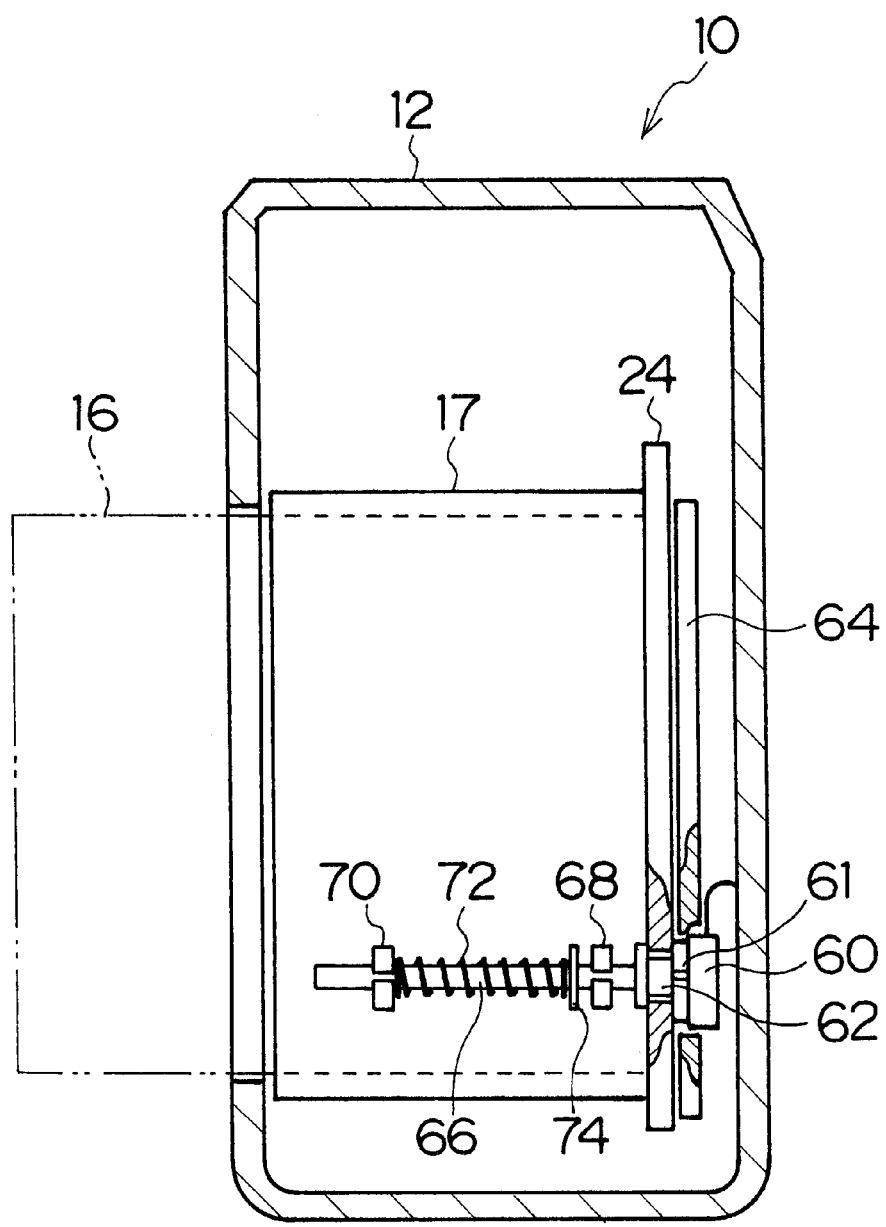
FIG. 2, is a sectional view taken along line 2—2 showing the camera with the magnetic recording unit in FIG. 1.

FIG. 1 is a front view of a camera 10 with a magnetic recording unit according to a preferred embodiment of the present invention, and FIG. 2 is a sectional view taken along line 2—2 in FIG. 1.

As shown in FIG. 1, a body 12 of the camera 10 takes the shape of a box that is long from side to side, and a zoom lens barrel 16 including a taking lens 14 is arranged at the center of the body 12. As shown in FIGS. 1 and 2, the zoom lens barrel 16 is contained in a fixed cylinder 17 provided in the body 12. The zoom lens barrel 16 is a so-called collapsible zoom lens barrel, which is extended from a collapse position in the fixed cylinder 17 to an initial position when a power switch of the camera 10 is turned on. The extended zoom lens barrel 16 is zoomed by operating a zoom lever (not shown) provided on the body 12 so that the photographic magnification can be set at a desired one.

An objective part 18 of a finder is provided above the zoom lens 16 in the body 12. A plurality of movable lenses are arranged in the objective part 18, and the movable lenses are moved forward and backward along the optical axis of the finder in connection with the zooming operation of the zoom lens barrel 16. Consequently, an image of a subject that is magnified according to the magnification set by the zoom lens barrel 16 is observed through an eyepiece (not shown) of the finder.

An autofocus (AF) light projecting part 28 is arranged at the right side of the objective part 18 of the finder, and an AF light receiving part 26 is arranged at the left side of the objective part 18. A film cartridge chamber 30 is formed at the left side of the zoom lens barrel 16 as indicated with a broken line in FIG. 1. A film cartridge chamber lid 32 is provided at the bottom of the film cartridge chamber 30 so that the lid 32 can freely turn on a pivot 34 to open and close the film cartridge chamber 30. A film cartridge (not shown) is loaded in the film cartridge chamber 30 by opening the lid 32.

When the film cartridge is loaded in the film cartridge chamber 30, a photographic film wound in the film cartridge is automatically fed to the outside by a feed mechanism (not shown) built in the camera 10. Then, the leader of the feeding photographic film passes by an aperture 22 (see FIG. 3), and the photographic film stops feeding when the leader of the photographic film has been wound by a predetermined amount on a take-up spool 36 in a take-up chamber 35 in FIG. 1. Thereafter, the photographic film is wound onto the take-up spool 36 on a frame-by-frame basis upon taking a photograph by pressing a shutter release button 38 in FIG. 1.

A main capacitor 40, which supplies electricity to an electronic flash part 46, is arranged vertically in a space between the film cartridge chamber 30 and the body 12. An electronic flash booster circuit board 42 is provided above the take-up chamber 35, and a trigger coil 44 is attached to the back side of the electronic flash booster circuit board 42.

The electronic flash part 46 is retractably provided above the electronic flash booster circuit board 42. The unused electronic flash part 46 is housed in the body 12 of the camera 10. When the electronic flash part 46 is used, the electronic flash part 46 projects from the top of the body 12 as indicated with alternate long and two short dashes line in FIG. 1. The electronic flash part 46 has an electronic flash cover 48, inside which an emission tube 50 and a reflector 52 for holding the emission tube 50 are arranged. The reflector 52 is supported by a guide member (not shown) arranged in the electronic flash cover 48 so that it can freely move forward and backward. The reflector 52 is moved forward and backward in connection with the zooming operation of the zoom lens barrel 16. In other words, the electronic flash part 46 is a zoom electronic flash with a variable illumination angle, which works in connection with the zooming operation. A battery 54 is loaded in a battery chamber formed behind a part for housing the electronic flash part 46.

The camera 10 of this embodiment is an APS camera, which uses a photographic film coated with a magnetic recording layer. The camera 10 has the built-in magnetic recording unit comprising a magnetic head 60 and a pad 62 as shown in FIGS. 2 and 3.

As shown in FIG. 2, the magnetic head 60 is fixed to a pressure plate 64 so that a head gap face 61 of the magnetic head 60 can be parallel with the back side of a light-shielding rib 24. The aperture 22 is formed in the light shielding rib 24 as shown in FIG. 3. A rectangular opening 25 is formed in the light-shielding rib 24 to expose the head gap face 61. The pad 62 is arranged to be pressed toward the head gap face 61 through the opening 25. Thus, the magnetic recording layer of the photographic film moving between the light shielding rib 24 and the pressure plate 64 is pressed against the magnetic head 60 by the pad 62.

Figure 4:
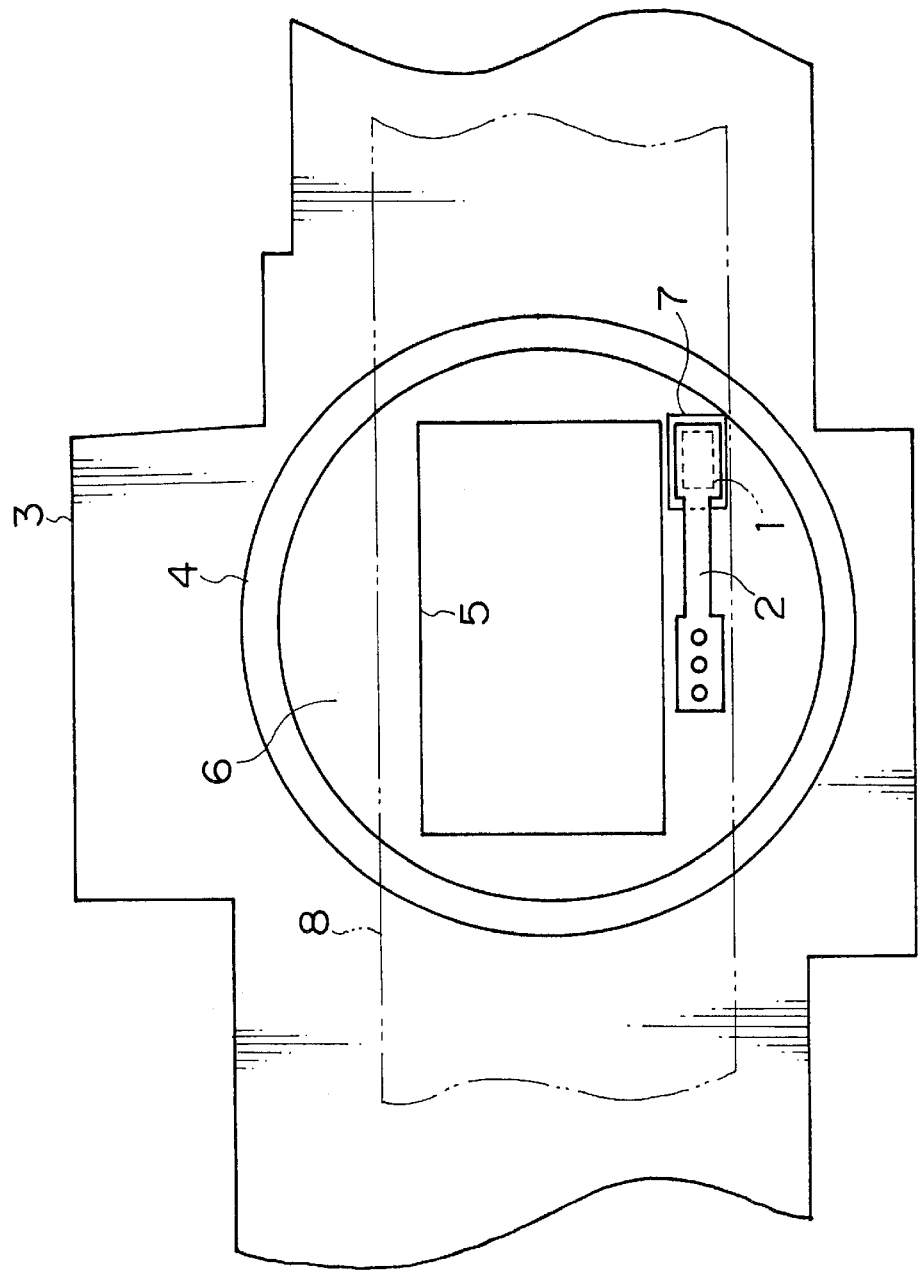
FIG. 4 is a view of assistance in explaining a position where a pad of a conventional magnetic recording unit in a camera.

As shown in FIG. 3, the pad 62 is arranged outside the fixed cylinder 17 and at the right side of the fixed cylinder 17. This is different from the arrangement of the pad 1 of the conventional magnetic recording unit in FIG. 4, wherein the pad 1 is arranged inside the fixed cylinder 4. In this embodiment, the magnetic head 60 is also arranged at a different position from the conventional magnetic recording unit since the pad 62 is arranged at the right side of the fixed cylinder 17. More specifically, the magnetic head 60 is arranged at the lower right side of the aperture 22 in FIG. 3, whereas the magnetic head of the conventional magnetic recording unit in FIG. 4 is arranged at the lower right of the aperture 5.

As shown in FIGS. 2 and 3, the pad 62 is fixed at an end of a rod 66. The rod 66 is supported on a pair of guide members 68 and 70, which are provided at the right side of the fixed cylinder 17 in FIG. 3. The rod 66 is guided in such a way as to slide vertically with respect to the head gap face 61 of the magnetic head 60. The distance between the guide members 68 and 70 is determined so that the rod 66 can slide lengthwise under stable conditions without vibrating laterally.

A compression spring 72, which presses the pad 62 toward the magnetic head 60, is put on the rod 66. As shown in FIG. 2, the front end of the compression spring 72 is in contact with the guide member 70, and the back end thereof is in contact with a flange 74 formed on the rod 66. The force of the compression spring 72 is transmitted from the flange 74 to the pad 62 through the rod 66. Consequently, the pad 62 is pressed vertically with respect to the head gap face 61 of the magnetic head 60 since the rod 66 is guided by the guide members 68 and 70.

In the camera 10 with the above-described magnetic recording unit, the pad 62 and the compression spring 72 are arranged outside the fixed cylinder 17, and this reduces the length of the fixed cylinder 17 to the minimum length required for containing the zoom lens barrel 16. Therefore, the camera 10 can be compact.

According to the camera 10, the pad 62 is supported in such a way as to move vertically to the head gap face 61 of the magnetic head 60 by the rod 66, and the compression spring 72 presses the pad 62 vertically to the head gap face 61. Therefore, the magnetic recording layer of the photographic film can be pressed vertically to the head gap face 61, and the data can be recorded in the magnetic recording layer under stable conditions. If the magnetic head 60 is a readable magnetic head, the data can be read from the magnetic recording layer under stable conditions.

As set forth hereinabove, the pad and the pressing member are arranged outside the fixed cylinder, and thus, the camera can be compact. Moreover, the pad is supported by the rod in such a way as to move vertically to the head gap face of the magnetic head, and the pressing member presses the pad vertically to the head gap face. Thus, the magnetic recording layer of the photographic film can be pressed vertically against the head gap face by the pad. Consequently, the data can be recorded in the magnetic recording layer under stable conditions.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:

a film cartridge chamber in which a film cartridge is loaded, the film cartridge containing a photographic film have a magnetic recording layer thereon;

a take-up chamber in which is provided a take-up spool for taking up the photographic film from the film cartridge in the film cartridge chamber;

a fixed cylinder arranged between the film cartridge chamber and the take-up chamber, the fixed cylinder containing a lens barrel;

a magnetic head which records magnetic information onto the magnetic recording layer of the photographic film;

a pad arranged outside of the fixed cylinder and facing the magnetic head, the photographic film being fed between the pad and the magnetic head;

a rod, the pad being attached to an end of the rod;

a guide member provided on an outer circumference of the fixed cylinder and slidably guiding the rod perpendicularly relative to a head gap face of the magnetic head; and a pressing member arranged outside of the fixed cylinder, the pressing member pressing the rod which, in turn, moves the pad toward the magnetic head to press the magnetic recording layer of the photographic film against the magnetic head.

2. The camera according to claim 1, wherein the pressing member is a spring.

3. The camera according to claim 1, wherein the spring acts between said rod and said guide member.

* * * * *